(12) United States Patent
Minami et al.

(10) Patent No.: US 7,405,612 B2
(45) Date of Patent: Jul. 29, 2008

(54) ELECTRONIC DEVICE

(75) Inventors: Yukimasa Minami, Chiba (JP);
Yoshifumi Yoshida, Chiba (JP);
Fumiyasu Utsunomiya, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 11/498,704

(22) Filed: Aug. 3, 2006

(65) Prior Publication Data

US 2007/0102517 A1    May 10, 2007

(30) Foreign Application Priority Data

Aug. 4, 2005    (JP)    ............... 2005-227068

(51) Int. Cl.
*G06F 1/10*    (2006.01)
(52) U.S. Cl. ...................... 327/536; 235/435

(58) Field of Classification Search ................. 327/530, 327/536–537
See application file for complete search history.

(56) References Cited

U.S. PATENT DOCUMENTS

| 5,491,445 | A | * | 2/1996 | Moller et al. | ............... 327/540 |
| 5,677,874 | A | * | 10/1997 | Yamano | ............... 365/185.18 |
| 6,856,838 | B2 | * | 2/2005 | Parramon et al. | ............. 607/61 |

FOREIGN PATENT DOCUMENTS

JP    H11-055165    2/1999

\* cited by examiner

*Primary Examiner*—Dinh T. Le
(74) *Attorney, Agent, or Firm*—Brinks Hofer Gilson & Lione

(57) ABSTRACT

A Provided is an electronic device in which: alternating current power from an RF coil which receives an electromagnetic wave and converts the electromagnetic wave into power is rectified by a diode and a first capacitor; the power is stepped up by a charge pump type step-up circuit; the power stepped up by the step-up circuit is stored in a second capacitor by a charging and discharging circuit; and the stored power is supplied from the charging and discharging circuit to an RF transmission circuit.

2 Claims, 2 Drawing Sheets

ELECTRONIC DEVICE

This application claims priority under 35 U.S.C. §119 to Japanese Patent Application No. JP2005-227068 filed Aug. 4, 2005, the entire content of which is hereby incorporated by reference.

BACKGROUND OF THE INVENTION

1. Field of the Invention

The present invention relates to an electronic device, and more particularly, to a technique capable of reducing power wasted in a non-contact IC card, which is carried by a person, used for entrance and exit control, payment, and used as an electronic ticket, or in a sensor network device used for security system, distribution system, or the like, thereby improving energy use efficiency of the entire system.

2. Description of the Related Arts

As shown in FIG. 4, a conventional electronic device includes an RF coil 401 for receiving an magnetic field or a radio wave and generating power, a diode 406 and a capacitor 407 which are used for converting alternating current (AC) of the RF coil 401 into a direct current (DC), and an RF transmission circuit 404 (JP 11-055165 A).

As a point for classifying electronic devices having this configuration, there is a point as to whether or not an electronic device itself has an energy source to perform independent operation. For example, in a case of an application which is represented by an RFID chip and which targets the replacement of a bar code or a case of a railroad ticket gate system using an IC card, the electronic device itself does not have a battery and thus operates on power electromagnetically supplied to the device simultaneously with communication. Since independent operation is impossible in this application, operation area of the device is limited. The device can be used only in an area in which a corresponding reader/writer locates. Accompanying transmission of electric power limits an operating distance from a reader. In many cases, the device is made light in weight and an extremely large number of devices are used in a low-cost application. On the other hand, there is a system in which a device has a battery or an external power source to perform independent operation. Up to now, such system is used in a field of security, distribution, or the like. Such independent systems are so-called sensor network systems for sensing something and generating a notice of a result obtained by the sensing. In a case of a security system, a person or a fire is sensed. In a case of a distribution system, a temperature of a product under transportation, or the like, is sensed. As a case where the sensing is not performed, there is an application in an information transmission, such as remote control of a key in a security system or price display tag in a distribution system, which is gaining great expectation in the sensor network system.

In the conventional electronic device, an electromagnetic wave is transmitted to the sky, so a certain amount of power is necessary for both transmission and reception in radio communication. In the radio communication, only a slight part of transmitted power reaches the RF coil 401 located on a reception side. Therefore, when the received power is amplified by an RF amplifier or the like (not shown in FIG. 4), unnecessary power is consumed. Alternatively, when the power is to be received at one time, it is necessary to increase the size of the RF coil 401. In this case, there is a problem in that a total effective area of the electric device increases. In addition, when the battery or the external power source is used instead of the RF coil 401, the power is consumed even in a standby state (state in which circuits are not operated), so there is a problem in that energy use efficiency is very low.

SUMMARY OF THE INVENTION

The present invention has been made in view of the above-mentioned inconveniences included in the conventional technique. An object of the present invention is to reduce wasted power consumed in a standby state to improve energy use efficiency of the entire system.

In order to attain the object, an electronic device according to the present invention includes: an RF coil for receiving an electromagnetic wave and converting the electromagnetic wave into power; a step-up circuit connected with the RF coil through a rectifying circuit including a diode and a first capacitor; a charging and discharging circuit which is connected with the step-up circuit and which includes a second capacitor for storing power stepped up by the step-up circuit, for controlling charge and discharge of the second capacitor; and an RF transmission circuit connected with the charging and discharging circuit, in which a charge pump type circuit operated by a capacitor is used as the step-up circuit.

Therefore, the wasted power consumed in the standby state can be reduced to improve the energy use efficiency of the entire system.

According to the electronic device of the present invention, the following effects can be obtained.

(1) Standby power consumption while the RF transmission circuit is not operated equals to zero.

(2) The electronic device includes the step-up circuit, so information can be transmitted even with a low generated voltage. In other words, a size of a coil can be reduced and transmitted power from a system side can be reduced.

(3) The charge pump type circuit operated by switching of only a capacitor is used as the step-up circuit, so the amount of generated noise is small.

DESCRIPTION OF THE PREFERRED EMBODIMENTS

Hereinafter, an electronic device according to a best embodiment of the present invention will be described in detail with reference to the drawings. The electronic device according to this embodiment relates to a device to which power is supplied from an RF coil receiving an electromagnetic wave to operate a system.

Figure 1:
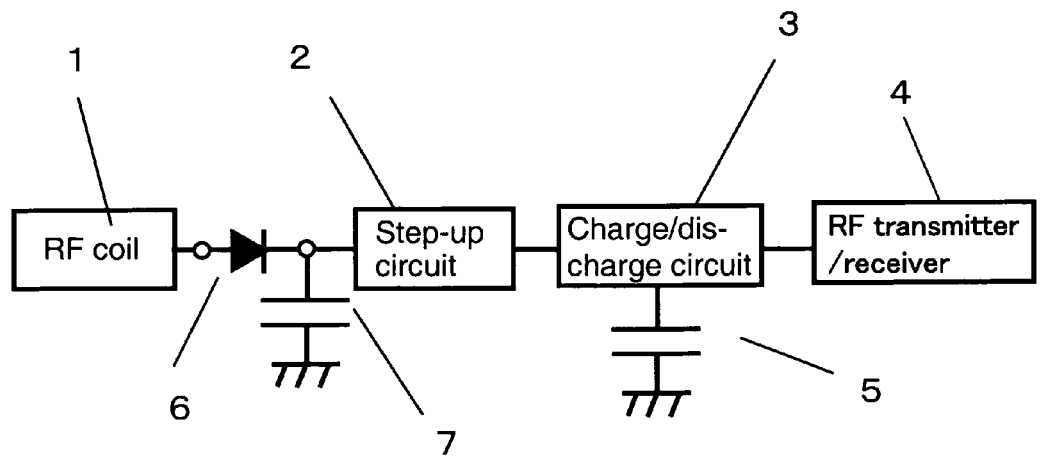
FIG. 1 is a block diagram showing a schematic structure of an electric device according to an embodiment of the present invention.

FIG. 1 shows a schematic structure of the electronic device according to this embodiment. The electronic device includes an RF coil 1 for receiving the electromagnetic wave and converting the electromagnetic wave into power (voltage), a diode 6 and a capacitor 7 which are used for converting an alternating current power of the RF coil 1 into a direct current voltage, a step-up circuit 2 for stepping up the converted direct current voltage, a capacitor 5 for storing power (voltage) stepped up by the step-up circuit 2, a charging and discharging circuit 3 for monitoring the voltage of the capacitor 5 and controlling the charge and discharge of the capacitor 5, and an RF transmission circuit 4.

When large power is to be obtained from the RF coil 1 at one time, it is necessary to increase a size of the RF coil 1. A regulator using a coil and a capacitor or a charge pump type circuit for performing switching of only the capacitor is used as the step-up circuit 2. When an output voltage from the RF coil 1 is small, it is necessary to use a step-up circuit which performs a step-up operation with a low voltage. In addition to the capacitor, an electric double layer or a secondary battery is used as the capacitor 5. The charging and discharging circuit 3 has a function for causing the capacitor 5 to store the power supplied from the step-up circuit 2.

The respective blocks of the electronic device according to the present invention are connected in the following manner. An output terminal of the RF coil 1 is connected with an input terminal of the step-up circuit 2 through a rectifying circuit composed of the diode 6 and the capacitor 7. An output terminal of the step-up circuit 2 is connected with an input terminal of the charging and discharging circuit 3. A charge and discharge terminal of the charging and discharging circuit 3 is connected with an input terminal of the capacitor 5. A ground terminal of the capacitor 5 is grounded. An output terminal of the charging and discharging circuit 3 is connected with a power source input terminal of the RF transmission circuit 4.

The electronic device in which the blocks are connected with one another as described above operates as follows.

Upon receiving an electromagnetic wave, the RF coil 1 generates power (voltage). The power is stepped up by the step-up circuit 2. The step-up circuit 2 is activated in response to the power supplied from the RF coil 1 and starts a step-up operation. When the voltage outputted from the RF coil 1 is extremely low, the operation order of the step-up circuit 2 is very important. First, an oscillation circuit provided in the step-up circuit 2 starts to operate with the power supplied from the RF coil 1, thereby staring the step-up operation. A voltage stepped up at this time is not so high. However, through returning the stepped up voltage to an internal circuit of the step-up circuit 2, an output voltage of the step-up circuit 2 can be gradually increased. A high voltage can be generated by repetition of such an operation. The stepped up power is charged to the capacitor 5 through the charging and discharging circuit 3. Then, the power stored in the capacitor 5 is supplied to the RF transmission circuit 4 at one time.

Figure 2:
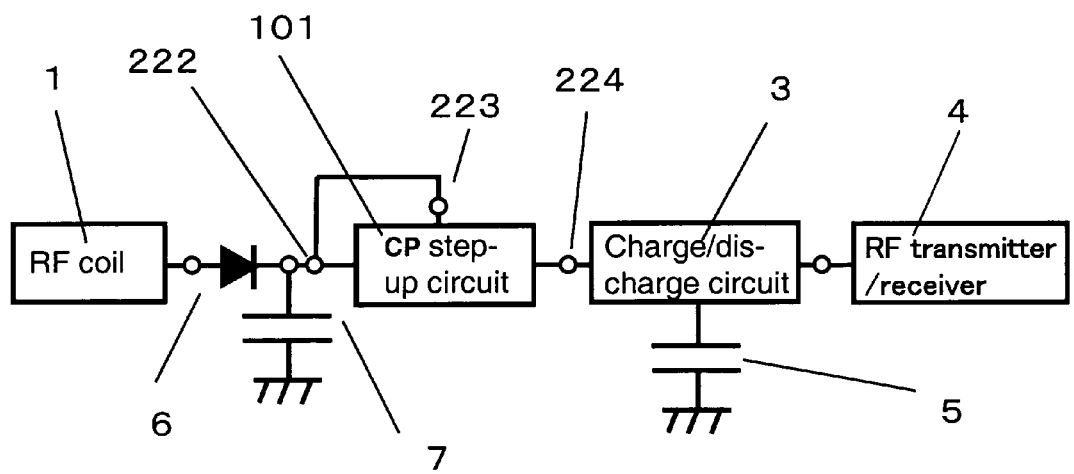
FIG. 2 is a block diagram showing a schematic structure of the electric device according to the embodiment of the present invention.

A charge pump type step-up circuit for performing switching of only a capacitor (hereinafter, referred to as a CP step-up circuit) is used as the step-up circuit 2 in the present invention. This is because, unlike a regulator type step-up circuit using the coil and the capacitor, no magnetic field is generated by the coil in the charge pump type step-up circuit for performing switching of only the capacitor, so the generation of noise can be prevented. FIG. 2 shows a schematic structure of the electronic device according to the embodiment of the present invention in the case where the CP step-up circuit is used as the step-up circuit 2 shown in FIG. 1.

Figure 3:
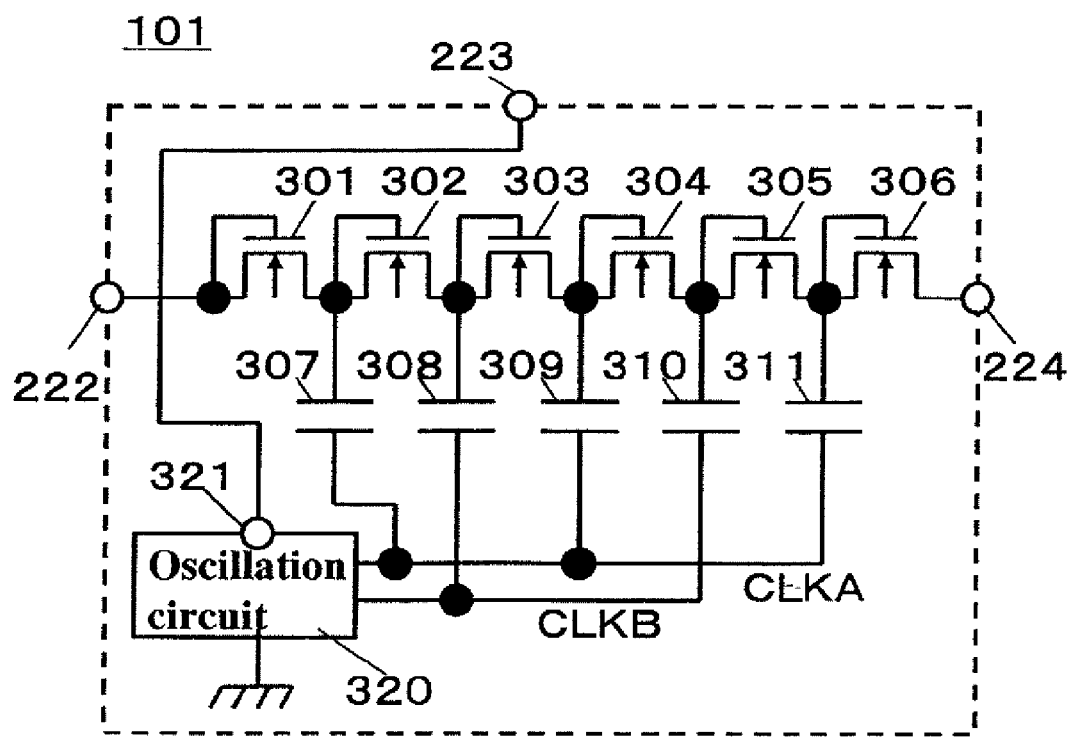
FIG. 3 is a schematic circuit diagram showing a CP step-up circuit of FIG. 2 which is related to the electric device according to the embodiment of the present invention.
Figure 4:
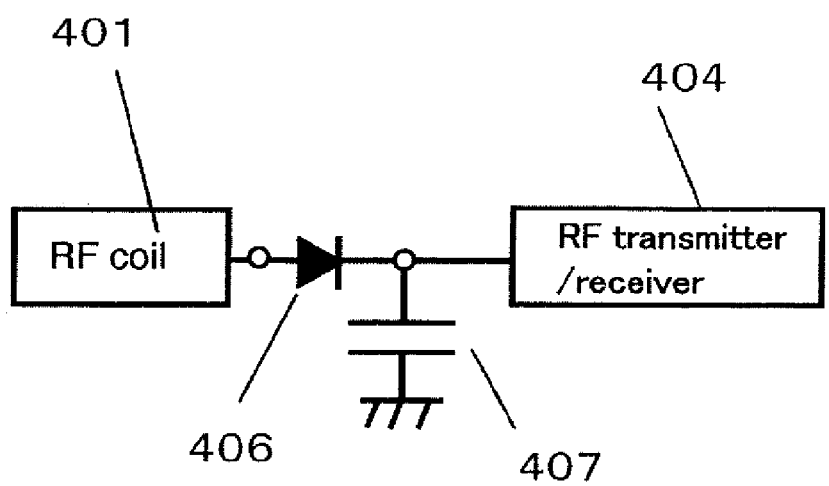
FIG. 4 is a block diagram showing a schematic structure of a conventional electric device.

FIG. 3 is a schematic circuit diagram showing a CP step-up circuit 101 related to the electronic device according to the present invention shown in FIG. 2.

Hereinafter, a structure of the CP step-up circuit 101 will be described in detail with reference to FIG. 3.

As shown in FIG. 3, the CP step-up circuit 101 includes an oscillation circuit 320, fully-depleted type N-channel MOSFETs produced using SOI wafers (hereinafter, referred to as FD-SOI type NMOSs) 301 to 306, and step-up capacitors 307 to 311. The respective FD-SOI type NMOSs 301 to 306 have a diode connection and are directly connected between an input terminal 222 of the CP step-up circuit 101 and an output terminal 224 of the CP step-up circuit 101 such that a direction from the input terminal 222 to the output terminal 224 becomes the forward direction. A node between the FD-SOI type NMOSs 301 and 302 is connected with a first electrode of the step-up capacitor 307. A node between the FD-SOI type NMOSs 302 and 303 is connected with a first electrode of the step-up capacitor 308. A node between the FD-SOI type NMOSs 303 and 304 is connected with a first electrode of the step-up capacitor 309. A node between the FD-SOI type NMOSs 304 and 305 is connected with a first electrode of the step-up capacitor 310. A node between the FD-SOI type NMOSs 305 and 306 is connected with a first electrode of the step-up capacitor 311. A clock signal "A" (CLKA) with an on-duty 50% which is outputted from the oscillation circuit 320 is inputted to second electrodes of the step-up capacitors 307, 309, and 311. A clock signal "B" (CLKB) whose phase is shifted from that of the clock signal "A" (CLKA) by 90 degrees and whose other conditions are completely identical to those of the clock signal "A" (CLKA) is inputted to second electrodes of the step-up capacitors 308 and 310. A power source terminal 321 of the oscillation circuit 320 is connected with a power source terminal 223 of the CP step-up circuit 101.

Note that each of the FD-SOI type NMOSs 301 to 306 has a threshold value of approximately 0.15 V and the oscillation circuit 320 includes the fully-depleted type CMOSFETs produced using the SOI wafers. Therefore, the CP step-up circuit 101 can be operated in a case where a voltage equal to or larger than 0.3 V which is extremely low for an operating voltage of the electronic device is applied to the power source terminal 321.

A frequency of each of the clock signal "A" (CLKA) and the clock signal "B" (CLKB) which are outputted from the oscillation circuit 320 is set to approximately 1 MHz. It is sufficient that the power outputted from the output terminal 224 of the CP step-up circuit 101 is approximately 5 µW. Therefore, it is only necessary that the step-up capacitors 307 to 311 have approximately 100 pF. Thus, the step-up capacitors 307 to 311 can be formed in the same chip including the FD-SOI type NMOSs 301 to 306 and the oscillation circuit 320.

In other words, when the CP step-up circuit is constructed as described above, a mounting area can be reduced. When a voltage equal to or larger than 0.3 V is applied to the input terminal and the power source terminal of the CP step-up circuit, it is possible to realize a CP step-up circuit capable of obtaining power of approximately 5 µW in which a voltage is stepped up to 1.5 V.

When the above-mentioned structure is used, the step-up circuit which starts to operate from a low voltage is connected with the RF coil. Therefore, even when the RF coil is small in size and thus generated power is low, information can be transmitted. As a result, transmitted power from a system side can also be reduced.

The step-up circuit is connected with the charging and discharging circuit and the capacitor. Therefore, even when generated power received by the RF coil is small, the power can be stored in the capacitor and then supplied to the RF transmission circuit at one time. Power consumption in a standby state in which the power is not received by the RF coil 1 becomes zero.

The present invention is available for a sensor network system.

What is claimed is:

1. An electronic device, comprising:

an RF coil for receiving an electromagnetic wave and converting the electromagnetic wave into electric power, the electromagnetic wave sufficient to generate a weak electric power that is less than a predetermined electric power;

a step-up circuit coupled to the RF coil through a rectifying circuit including a diode and a first capacitor, activated in response to the electric power supplied from the RF coil and comprising a charge pump circuit wherein the predetermined electric power is obtained by feedback of the weak electric power converted by the rectifying circuit;

a charging and discharging circuit connected to the step-up circuit, having a second capacitor for storing electric power stepped up by the step-up circuit, and controlling charge and discharge of the second capacitor; and an RF transmission circuit connected to the charging and discharging circuit.

2. An electronic device according to claim 1, wherein the step-up circuit comprises an oscillation circuit, a step-up capacitor and a fully-depleted type N-channel MOSFET disposed on an SOI wafer, the oscillation circuit, the step-up capacitor and the fully-depleted type N-channel MOSFET being disposed in a chip.

* * * * *